UNITED STATES PATENT OFFICE.

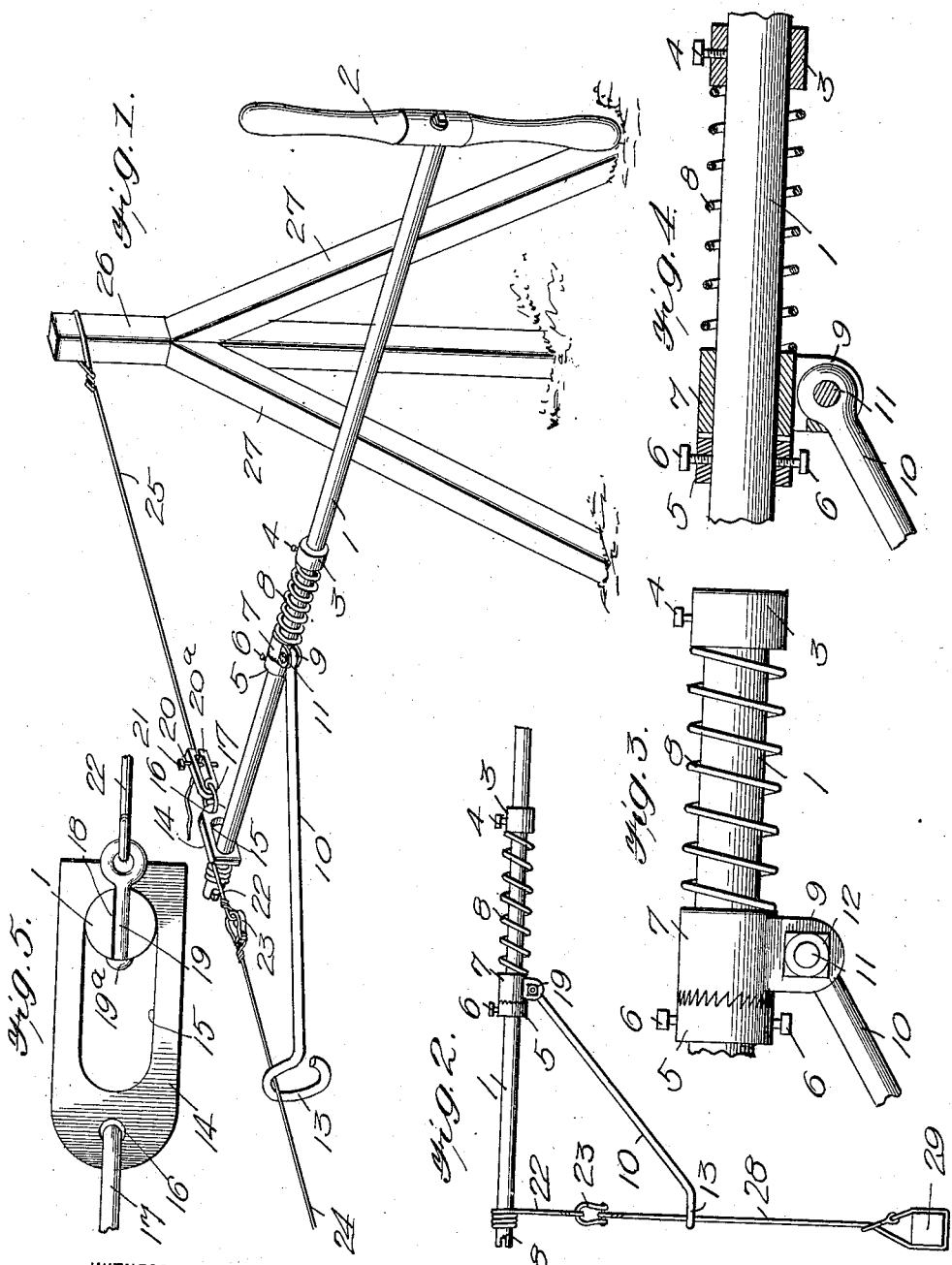

JOHN L. McFADDEN, OF NESS CITY, KANSAS.

WIRE-STRETCHER.

1,153,093.

Specification of Letters Patent.   Patented Sept. 7, 1915.

Application filed March 6, 1915.   Serial No. 12,545.

*To all whom it may concern:*

Be it known that I, JOHN L. MCFADDEN, a citizen of the United States, and a resident of Ness City, in the county of Ness and State of Kansas, have invented a new and useful Improvement in Wire-Stretchers, of which the following is a specification.

My invention is an improvement in wire stretchers, and has for its object to provide a simple easily operated inexpensive and powerful device of the character specified, for stretching wires, as for instance, in fence construction or repair, wherein the mechanism is arranged in such manner that the operator may stretch the wire while standing at such a distance from the stretched wire that there will be no danger of injury in case of breakage or release of any of the parts.

In the drawings:—Figure 1 is a perspective view of the improved stretcher in operation, Fig. 2 is a partial top plan view, Fig. 3 is an enlarged detail of a portion of the device looking down upon the same, Fig. 4 is a sectional view of Fig. 3, and Fig. 5 is a front view of the guide plate.

The present embodiment of the invention comprises a shaft or rod 1 of suitable length and cross section and provided at one end with a handle 2, the handle being arranged crosswise of the rod in such manner that the rod may be turned by means of the handle like an auger. A collar 3 is arranged on the rod intermediate the ends thereof, the collar being held in adjusted position by means of a set screw 4, which is threaded through the collar into engagement with the periphery of the rod 1. A second collar 5 is arranged on the rod in spaced relation with respect to the collar 3, and this collar 5 is held in fixed position on the shaft by means of oppositely arranged set screws 6, each set screw being threaded through the collar into engagement with the rod or shaft. It will be noted that the collar 5 is provided with a series of ratchet teeth on the end adjacent to the collar 3, and the said collar is in effect a fixed section of a clutch. The movable section of the clutch comprises a sleeve or collar 7 mounted to slide on the shaft at the end adjacent to the teeth of the collar 5, and the said sleeve or collar 7 is provided with a series of ratchet teeth at the end adjacent to the collar 5 for coöperating with the teeth of the collar 5.

A coil spring 8 encircles the shaft between the collar 3 and the sleeve or collar 7, and the spring acts normally to hold the clutch teeth of the fixed and the movable sections in engagement with each other. The sleeve or collar 7 is provided with a pair of parallel spaced radial lugs 9, and one end of an arm 10 is received between the lugs. This end of the arm is provided with an eye, and a bolt 11 is passed through registering openings in the lugs and through the eye to pivotally connect the arm to the sleeve or collar. The bolt is engaged by a nut 12 to hold the parts in place, and the arm 10 has a hook or open loop 13 at the opposite end from the eye.

A plate 14 is provided for use in connection with the rod or shaft, and the plate has an elliptical opening 15 intermediate its ends. One end of the plate is rounded and is provided with an opening 16 for engagement by a ring 17 for a purpose to be presently described. The slot 15 is of a width somewhat greater than the diameter of the shaft or rod 1, and the said shaft or rod is intended to be passed through the slot as shown in Figs. 1 and 5.

The end of the shaft or rod remote from the handle 2 has a transverse kerf or recess 18, and an eye bolt 19 is arranged in the kerf or recess, the eye bolt having a head 19$^a$ at the end remote from the eye, and the eye and the head prevent longitudinal movement of the bolt in the recess or kerf.

A wire clamp or tie is connected with the ring 17, the said clamp consisting of oppositely arranged jaws 20 and 20$^a$ for gripping the wire, and the jaws are pressed together on the wire by means of a threaded bolt or rod 21.

A flexible member 22 is connected with the eye of the eye bolt, the said flexible member being a flexible metallic cable, and at its outer end the flexible member is engaged with the body of a U-shaped clevis 23.

In operation, when it is desired to splice a broken wire for instance, one of the ends 24 of the wire to be spliced is connected with the clevis or clip 23. The other end 25 of the wire is engaged with the wire clamp 20—20$^a$. The shaft is arranged as shown in Fig. 1, the end of the shaft provided with the recess or kerf 18 being passed through the slot 15 of the plate 14. The loop or hook 13 is engaged with the end 24 of the wire as shown in Fig. 1, and the tension of the spring 8 is adjusted to the proper degree by means of the collar 3. It will be evident that when the set screw 4 of the collar 3 is loosened the collar may be moved toward or from the sleeve or collar 7, to vary the tension of the spring. When the parts are arranged as above mentioned, the operator grasps the handle 2, and turns the shaft toward his right, that is, with the upper portion of the shaft moving to the right. The arm 10 by its engagement with the wire 24 prevents rotation of the sleeve or collar 7 with the shaft. When the operator turns the shaft 1 in a direction to wind up the cable 22 thereon, the teeth of the fixed and the movable sections of the clutch slip idly over each other, but these teeth interlock to prevent reverse movement of the shaft. Thus the cable 22 may be wound up on the shaft 1 until the wires have sufficient tension, that is, until they are stretched to the proper degree. When this has been done the ends may be spliced in the usual manner. In stretching fence wires the operation is the same. The end of the wire to be stretched in this instance is engaged with the clevis or clip 23, and the wire 25 having one end engaged with the clamp 20—20ª has the other end looped around the corner post 26. The said post is in the usual manner braced in two directions by inclined braces 27. During the assembling of the parts, the shaft 1 may be swung toward the post 26 before the hook 13 of the arm 10 is engaged with the wire 24 to be stretched, and merely by moving the handle to the left of the operator after the parts have been connected, a considerable tightening of the wire will result. The wire is further tightened by the rotation of the shaft 1 in a direction to wind up the cable 22. The slot 15 permits the shaft 1 to take an inclined position with respect to the plane of the plate 14. When not in use, the arm 10 is folded back upon the shaft 1 toward the handle, making thus a compact easily handled device. Any preferred form of wire clamp or tie may be used in connection with the shaft and the plate 14.

It is obvious that since the shaft 1 may be made of any desired length, and the operator works at the end of the said shaft remote from the wire, there is no danger of injury to the operator from breakage, since he is removed a considerable distance from the wire. It is also obvious that the stretching device may be anchored from either side.

In Fig. 1 the device is anchored by the wire 24, while in Fig. 2 the device is anchored by the cable 28, which instead of being connected to the clamp 20—20ª is connected to the clevis 23, the other end being connected to the anchoring post 29, corresponding to the post 26 in Fig. 1.

In the arrangement of Fig. 2, the operator stands on the opposite side of the fence from his position in Fig. 1, but the shaft 1 is rotated in the same direction. It will be obvious also that instead of engaging the eye bolt 19 with the kerf 18, the wire or the cable may be engaged directly with the recess. The eye bolt provides a convenient means for connecting either the wire to be stretched or the anchoring cable to the shaft.

I claim:—

1. A wire stretcher, comprising a shaft provided at one end with a transverse handle and at the other with a transverse kerf or recess, a plate having a longitudinal slot through which the shaft is adapted to extend, a wire clamp or tie connected with one end of the plate, a cable adapted to wind on the shaft on the opposite side of the plate from the handle, an eye bolt having at the end remote from the eye a head and adapted to engage the recess or kerf with the head at one side of the shaft and the eye at the other, the cable being connected with the eye, said cable having a wire tie at the outer end thereof, and means in connection with the shaft for preventing reverse rotation of the shaft and for permitting free forward rotation thereof, said means having anchoring means for engaging the wire to be stretched, and comprising a pair of collars arranged on the shaft and having at their adjacent ends intermeshing and coöperating ratchet teeth, one of the collars being adjustable on the shaft and having means for fixing the same in adjusted position, the other collar being rotatable on the shaft and having the anchoring means, a spring normally pressing the last-named collar toward the first-named collar, and means for varying the tension of the spring, said anchoring means comprising an arm pivoted to the collar and having a hook at its free end for engaging the wire.

2. A wire stretcher, comprising a shaft provided at one end with a transverse handle and at the other with a transverse kerf or recess, a plate having a longitudinal slot through which the shaft is adapted to extend, a wire clamp or tie connected with one end of the plate, a cable adapted to wind on the shaft on the opposite side of the plate from the handle, an eye bolt having at the end remote from the eye a head and adapted to engage the recess or kerf with the head at one side of the shaft and the eye at the other, the cable being connected with the eye, said cable having a wire tie at the outer end thereof, and means in connection with the shaft for preventing reverse rotation of the shaft and for permitting free forward rotation thereof, said means having anchoring means for engaging the wire to be stretched, and comprising a pair of collars arranged on the shaft and having at their adjacent ends intermeshing and cooperating ratchet teeth, one of the collars being adjustable on the shaft and having means for fixing the same in adjusted position, the other collar being rotatable on the shaft and having the anchoring means, a spring normally pressing the last-named collar toward the first-named collar, and means for varying the tension of the spring.

3. A wire stretcher, comprising a shaft provided at one end with a transverse handle and at the other with a transverse kerf or recess, a plate having a longitudinal slot through which the shaft is adapted to extend, a wire clamp or tie connected with one end of the plate, a cable adapted to wind on the shaft on the opposite side of the plate from the handle, an eye bolt having at the end remote from the eye a head and adapted to engage the recess or kerf with the head at one side of the shaft and the eye at the other, the cable being connected with the eye, said cable having a wire tie at the outer end thereof, and means in connection with the shaft for preventing reverse rotation of the shaft and for permitting free forward rotation thereof, said means having anchoring means for engaging the wire to be stretched.

4. A wire stretcher, comprising a shaft having at one end a handle, a plate having an opening to which the shaft is adapted to extend and provided with means for connecting the plate to the wire to be stretched or to an anchor, a cable adapted to wind on the shaft adjacent to the plate and having means at one end for engaging a wire or anchor, said cable and shaft having interengaging means for holding the said end of the cable, the shaft being adapted to be rotated to wind up the cable, and means for preventing reverse rotation of the shaft, said means having anchoring means for anchoring the same to prevent movement with the shaft.

5. A wire stretcher, comprising a shaft adapted to be rotated, a cable winding on the shaft at one end and having means at the other for engaging a wire or a fixed support, a plate having an opening for receiving the shaft, and adapted for connection with the wire or a fixed support, and releasable means on the shaft for preventing reverse rotation thereof, said means having an anchor for engaging the wire to be stretched to prevent movement of the same with the shaft.

JOHN L. McFADDEN.

Witnesses:
V. T. MILLER,
J. R. WATSON.